(12) United States Patent
Godewyn et al.

(10) Patent No.: US 10,468,051 B2
(45) Date of Patent: Nov. 5, 2019

(54) MEETING ASSISTANT

(71) Applicant: SugarCRM Inc., Cupertino, CA (US)

(72) Inventors: Charles Godewyn, Phoenix, AZ (US);
Filipe Guerra, San Jose, CA (US);
Vladyslav Kulchytskyy, Nashua, NH (US); Maria Zolotova, Mountain View, CA (US)

(73) Assignee: SUGARCRM INC., Cupertino, CA (US)

( * ) Notice: Subject to any disclaimer, the term of this patent is extended or adjusted under 35 U.S.C. 154(b) by 0 days.

(21) Appl. No.: 14/708,211

(22) Filed: May 9, 2015

(65) Prior Publication Data

US 2016/0329050 A1 Nov. 10, 2016

(51) Int. Cl.
*G10L 15/00* (2013.01)
*G10L 25/54* (2013.01)
*H04M 3/42* (2006.01)
*G10L 15/22* (2006.01)
*G10L 15/26* (2006.01)

(52) U.S. Cl.
CPC ......... *G10L 25/54* (2013.01); *H04M 3/42221* (2013.01); *G10L 15/22* (2013.01); *G10L 15/26* (2013.01); *H04M 2201/40* (2013.01); *H04M 2203/554* (2013.01)

(58) Field of Classification Search
CPC ........ G10L 15/22; G10L 15/30; G10L 15/265
USPC .................................................. 704/235, 270
See application file for complete search history.

(56) References Cited

U.S. PATENT DOCUMENTS

| | | | | |
|---|---|---|---|---|
| 7,672,845 | B2 * | 3/2010 | Beranek ................... | 379/265.09 |
| 8,898,063 | B1 * | 11/2014 | Sykes ..................... | G06Q 40/04 |
| | | | | 704/270 |
| 2008/0300872 | A1 * | 12/2008 | Basu ................. | G06F 17/30017 |
| | | | | 704/235 |
| 2012/0116766 | A1 * | 5/2012 | Wasserblat .............. | G10L 15/08 |
| | | | | 704/254 |

* cited by examiner

*Primary Examiner* — Vu B Hang
(74) *Attorney, Agent, or Firm* — Steven M. Greenberg, Esq.; Shutts & Bowen LLP

(57) ABSTRACT

Embodiments of the invention provide for the automated retrieval of contextual relevant data in an in-person meeting. In an embodiment of the invention, a method for the automated retrieval of contextual relevant data in an in-person meeting includes capturing speech audio in an in-person meeting through a transducer coupled to a personal computing device and speech recognizing the captured speech audio without regard to any speaker of the captured speech audio so as to produce a corpus of speech recognized text. The method also includes parsing the corpus of speech recognized text in order to identify a multiplicity of keywords and mapping the keywords to one or more records of an enterprise application. Finally, the method includes displaying a user interface to the enterprise application in the personal computing device and displaying in the user interface the one or more records.

3 Claims, 1 Drawing Sheet

MEETING ASSISTANT

BACKGROUND OF THE INVENTION

Field of the Invention

The present invention relates to meeting management and more particularly to an online meeting tool facilitating participation in-person meeting.

Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include both static synchronous forms of collaboration such as instant messaging and application sharing, and asynchronous forms of collaboration such as discussion forums and document libraries.

An e-meeting represents one popular form of electronic collaboration. In an e-meeting, participants can view a common space, for instance a whiteboard or a shared application (or both), through which ideas can be exchanged. The viewing of the common space can be complemented with a teleconference, a videoconference, an instant messaging session, or any combination thereof, such that the e-meeting can act as a near substitute for an in-person meeting in a conference room. Notwithstanding, many prefer an old-fashioned in-person meeting to an e-meeting of the modern computing infrastructure.

In this regard, in an in-person meeting, the context and content of presentation ideas and materials can be established based upon the attendees present in the meeting. Further, to determine the identity and nature of the attendees to an in-person meeting can be as simple as taking a visual scan of the room or conducting a roll call. Most importantly, in an in person meeting, the unspoken manner of communications amongst human beings can be readily detected—namely the processing of body language and facial expressions in connection with the comprehension of spoken language so as to ascertain a true message communicated by one attendee of the in-person meeting to another.

Of note, the task of participating in an in-person meeting therefore, is of greater difficulty than that of an e-meeting where the pace of interaction is necessarily slower due to the dependence upon technological tools to facilitate the collaboration of the e-meeting. In contrast, the pace of an in-person meeting can be so quick as to challenge each participant to keep pace with the exchange of ideas that often occurs in an in-person meeting. Online tools can be of some help in this regard. Those online tools include access to a Web search engine from which instant topical research in a topic of interest can be retrieved by a participant to an in-person meeting. Also, access to an on-line enterprise application can account for the rapid retrieval of contextual relevant data during an in-person meeting. Yet, much of the effectiveness of real-time data retrieval during an in-person meeting depends upon the agility of the participant in identifying a need to retrieve data in real time and satisfying that need. For an in-person meeting of particular fast pace, the ability of the participant to demonstrate such agility is limited.

BRIEF SUMMARY OF THE INVENTION

Embodiments of the present invention address deficiencies of the art in respect to real time data retrieval in an in-person meeting and provide a novel and non-obvious method, system and computer program product for the automated retrieval of contextual relevant data in an in-person meeting. In an embodiment of the invention, a method for the automated retrieval of contextual relevant data in an in-person meeting is provided. The method includes capturing speech audio in an in-person meeting through a transducer coupled to a personal computing device and speech recognizing the captured speech audio by a processor of the computing device without regard to any speaker of the captured speech audio so as to produce a corpus of speech recognized text. The method also includes parsing in memory of the personal computing device the corpus of speech recognized text in order to identify a multiplicity of keywords and mapping the keywords to one or more records of an enterprise application. Finally, the method includes displaying a user interface to the enterprise application in the personal computing device and displaying in the user interface the one or more records.

In one aspect of the embodiment, the enterprise application is a customer relationship management (CRM) application. To that end, the keywords may include any of a customer name and a company name. Alternatively, the keywords may include a name of a sales representative. In another aspect of the embodiment, the corpus of text represents a transcript of the in-person meeting. As such, in yet another aspect of the embodiment, the one or more records are stored with the corpus of text in a single file so as to provide a contextually robust transcript of the in-person meeting.

In another embodiment of the invention, a data processing system is configured for automated retrieval of contextual relevant data in an in-person meeting. The system includes a personal computing device that has memory, at least one processor and a display. The system also includes a user interface to an enterprise application displayed in the display. The system yet further includes a speech recognition engine executing in the memory of the personal computing device. Finally, the system includes a meeting assistant module executing in the memory of the personal computing device.

The module includes program code that, during execution of the module, directs the speech recognition to capture and speech recognize speech audio in an in-person meeting through a transducer coupled to a personal computing device without regard to any speaker of the captured speech audio so as to produce a corpus of speech recognized text, to parse the corpus of speech recognized text in order to identify a multiplicity of keywords, to map the keywords to one or more records of an enterprise application and to display a user interface to the enterprise application in the personal computing device and displaying in the user interface the one or more records.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the automated retrieval of contextual relevant data in an in-person meeting. In accordance with an embodiment of the invention, audio is captured by a microphone of a personal computing device during the conduct of an in-person meeting. The audio in turn is speech recognized in a speaker independent manner so as to produce a corpus of meeting text. The corpus of meeting text is then parsed to identify one or more different key words and a correspondence between the key words and data records in an enterprise system such as a CRM system are located. The data records are then retrieved an presented in a client user interface to the enterprise system for use by one or more of the participants to the in-person meeting during the conduct of the meeting. Optionally, the retrieved data records are added to a transcript of the in-person meeting so as to produce a more robust transcript of the in-person meeting.

Figure 1:
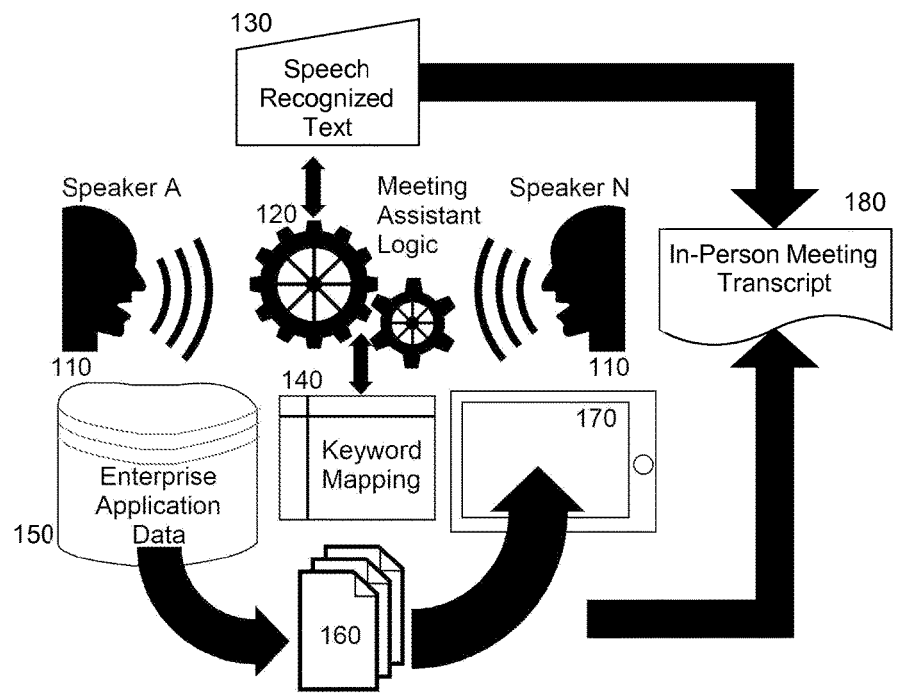
FIG. 1 is a pictorial illustration of a process for the automated retrieval of contextual relevant data in an in-person meeting.

In further illustration, FIG. 1 pictorially shows a process for the automated retrieval of contextual relevant data in an in-person meeting. As shown in FIG. 1, meeting assistant logic 120 disposed in a physically confined space with multiple different speakers 110 participating in an in-person meeting directs speech recognition of speech audio spoken by the different speakers 110 in order to produce speech recognized text 130. Meeting assistant logic 120 then parses the corpus of speech recognized text 130 to identify keywords present in keyword mapping 140. In this regard, the keyword mapping 140 maps different keywords to specific records 160 in enterprise application data 150 of an enterprise application such as a CRM application. The meeting assistant logic 120 then displays the records 160 mapped to the keywords of the corpus of the speech recognized text 130 in a personal computing device 170 such as a tablet computer or notebook computer. Thereafter, the speech recognized text 130 is combined with the records 160 mapped to the keywords in the keyword mapping 140 in order to produce a robust in-person meeting transcript 180.

Figure 2:
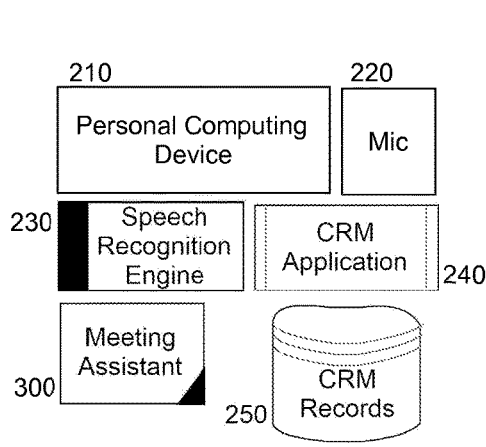
FIG. 2 is a schematic illustration of a data processing system configured for automated retrieval of contextual relevant data in an in-person meeting; and, FIG. 3 is a flow chart illustrating a process for the automated retrieval of contextual relevant data in an in-person meeting.

The process described in connection with FIG. 1 is implemented in a data processing system. In further illustration, FIG. 2 schematically shows a data processing system configured for automated retrieval of contextual relevant data in an in-person meeting. The system includes a personal computing device 210, such as a tablet computer, notebook computer or smartphone and a transducer such as a microphone 220 adapted to receive and transduce an audio signal. The personal computing device 210 includes at least one processor and memory and supports the execution of a speech recognition engine 230 and displays a CRM application user interface 240 in a display of the personal computing device 210.

Of import, a meeting assistant module 300 also executes in the memory of the personal computing device 210. The meeting assistant module 300 includes program code that when executed by one or more of the processors of the personal computing device 210, is enabled to direct the speech recognition engine 230 to speaker independent speech recognize detected speech audio received in the microphone 220 to produce a corpus of speech recognized text. The program code of the meeting assistant module 300 is further enabled to parse the corpus of speech recognized text in order to identify individual keywords mapped to one or more records 250 of the CRM application. The program code of the meeting assistant module 300 yet further is enabled to display the records 250 in the user interface 240 to the CRM application.

Figure 3:
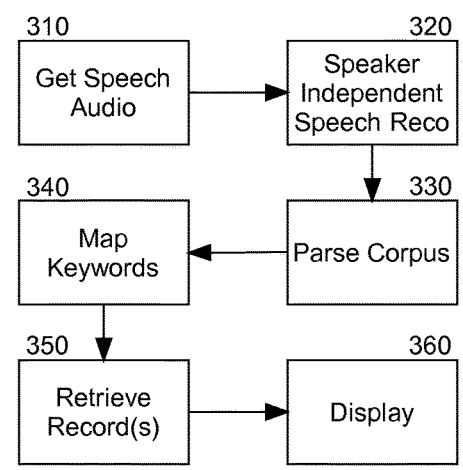

In even yet further illustration of the operation of the meeting assistant module 300, FIG. 3 is a flow chart illustrating a process for the automated retrieval of contextual relevant data in an in-person meeting. Beginning in block 310, speech audio is received and in block 320, speaker independent speech recognition is performed on the speech audio so as to produce a corpus of speech recognized text. In block 330, the corpus of text is parsed to generate a selection of keywords and the keywords are located in a mapping in block 340 so as to locate one or more records in block 350 of a CRM application. Thereafter, in block 360 the located records are displayed in a user interface to the CRM application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for the automated retrieval of contextual relevant data in an in-person meeting, the method comprising:

capturing speech audio in an in-person meeting through a transducer coupled to a personal computing device;

speech recognizing the captured speech audio by a processor of the computing device without regard to any speaker of the captured speech audio so as to produce a corpus of speech recognized text;

parsing in memory of the personal computing device the corpus of speech recognized text in order to identify a multiplicity of keywords, wherein the keywords comprise any of a name of a customer, a name of a company of the customer and a name of a sales representative;

mapping the keywords to one or more records of an enterprise application comprising a customer relationship management (CRM) application wherein the one or more records comprise previous customer interactions associated with the keywords and stored in the CRM application prior to the meeting;

retrieving the one or more data records from the CRM application based on the identified multiplicity of keywords;

displaying a user interface to the enterprise application in the personal computing device and displaying in the user interface the retrieved one or more records during the in-person meeting and while capturing the speech audio; and, storing the corpus of speech recognized text along with each of the retrieved one or more records for each of the identified keywords in a single file as a transcript of the in-person meeting during the in-person meeting and while capturing the speech audio.

2. A data processing system configured for automated retrieval of contextual relevant data in an in-person meeting, the system comprising:

a personal computing device comprising memory, at least one processor and a display;

a user interface to an enterprise application displayed in the display;

a speech recognition engine executing in the memory of the personal computing device; and, a meeting assistant module executing in the memory of the personal computing device, the module comprising program code that, during execution of the module, directs the speech recognition to capture and speech recognize speech audio in an in-person meeting through a transducer coupled to a personal computing device without regard to any speaker of the captured speech audio so as to produce a corpus of speech recognized text, to parse the corpus of speech recognized text in order to identify a multiplicity of keywords, wherein the keywords comprise any of a name of a customer, a name of a company of the customer and a name of a sales representative, to map the keywords to one or more records of an enterprise application comprising a customer relationship management (CRM) application wherein the one or more records comprise previous customer interactions associated with the keywords and stored in the CRM application prior to the meeting, to retrieve the one or more data records from the CRM application based upon the identified multiplicity of keywords, to display a user interface to the enterprise application in the personal computing device and displaying in the user interface the retrieved one or more records during the in-person meeting and while capturing the speech audio and to store the corpus of speech recognized text along with each of the retrieved one or more records for each of the identified keywords in a single file as a transcript of the in-person meeting during the in-person meeting and while capturing the speech audio.

3. A computer program product for the automated retrieval of contextual relevant data in an in-person meeting, the computer program product comprising a non-transitory computer readable storage medium having program instructions embodied therewith, the program instructions executable by a device to cause the device to perform a method comprising:

capturing speech audio in an in-person meeting through a transducer coupled to a personal computing device;

speech recognizing the captured speech audio by a processor of the computing device without regard to any speaker of the captured speech audio so as to produce a corpus of speech recognized text;

parsing in memory of the personal computing device the corpus of speech recognized text in order to identify a multiplicity of keywords, wherein the keywords comprise any of a name of a customer, a name of a company of the customer and a name of a sales representative;

mapping the keywords to one or more records of an enterprise application comprising a customer relationship management (CRM) application wherein the one or more records comprise previous customer interactions associated with the keywords and stored in the CRM application prior to the meeting;

retrieving the one or more data records from the CRM application based on the identified multiplicity of keywords;

displaying a user interface to the enterprise application in the personal computing device and displaying in the user interface the retrieved one or more records during the in-person meeting and while capturing the speech audio; and, storing the corpus of speech recognized text along with each of the retrieved one or more records for each of the identified keywords in a single file as a transcript of the in-person meeting during the in-person meeting and while capturing the speech audio.

* * * * *